United States Patent
Arakawa et al.

(10) Patent No.: US 11,603,772 B2
(45) Date of Patent: Mar. 14, 2023

(54) FORCED INDUCTION DEVICE

(71) Applicant: MITSUBISHI HEAVY INDUSTRIES ENGINE & TURBOCHARGER, LTD., Sagamihara (JP)

(72) Inventors: Takuya Arakawa, Tokyo (JP); Takaya Futae, Tokyo (JP); Shuichi Miura, Tokyo (JP); Yosuke Danmoto, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 132 days.

(21) Appl. No.: 16/970,554

(22) PCT Filed: Feb. 20, 2018

(86) PCT No.: PCT/JP2018/005898
§ 371 (c)(1),
(2) Date: Aug. 17, 2020

(87) PCT Pub. No.: WO2019/162989
PCT Pub. Date: Aug. 29, 2019

(65) Prior Publication Data
US 2021/0115811 A1    Apr. 22, 2021

(51) Int. Cl.
*F01D 25/04* (2006.01)
*F01D 5/04* (2006.01)
(Continued)

(52) U.S. Cl.
CPC ............. *F01D 25/04* (2013.01); *F01D 5/048* (2013.01); *F01D 25/166* (2013.01); *F02B 39/14* (2013.01);
(Continued)

(58) Field of Classification Search
CPC ........ F01D 25/04; F01D 25/166; F01D 5/048; F02B 39/00; F02B 39/14; F05D 2240/04;
(Continued)

(56) References Cited

U.S. PATENT DOCUMENTS

| 5,605,045 A | 2/1997 | Halimi et al. |
| 8,740,465 B2 * | 6/2014 | McKeirnan, Jr. ..... F16C 35/077 384/519 |

(Continued)

FOREIGN PATENT DOCUMENTS

| EP | 0184457 A1 | 6/1986 |
| JP | 59-116537 U | 8/1984 |

(Continued)

OTHER PUBLICATIONS

International Search Report for International Application No. PCT/JP2018/005898, dated May 15, 2018, with English translation.

(Continued)

*Primary Examiner* — Audrey B. Walter
*Assistant Examiner* — Dapinder Singh
(74) *Attorney, Agent, or Firm* — Birch, Stewart, Kolasch & Birch, LLP

(57) ABSTRACT

A forced induction device (100) includes: a rotor (1) which includes a turbine side shaft portion (11), a compressor side shaft portion (12), and a connection shaft portion (13) connecting these to each other; a turbine side bearing (5) which supports the turbine side shaft portion (11); and a compressor side bearing (6) which supports the compressor side shaft portion (12). A rigidity of the connection shaft portion (13) is lower than that of the turbine side shaft portion (11) and the compressor side shaft portion (12) so that a node in a mode shape at each critical speed involving (Continued)

with an operating rotational speed region of the rotor (1) is located between the turbine side bearing (5) and the compressor side bearing (6).

3 Claims, 7 Drawing Sheets

(51) Int. Cl.
| | | |
|---|---|---|
| *F01D 25/16* | (2006.01) | |
| *F02B 39/14* | (2006.01) | |
| *F16C 3/02* | (2006.01) | |
| *F16C 17/02* | (2006.01) | |
| *F16C 23/04* | (2006.01) | |
| *F16C 33/10* | (2006.01) | |

(52) U.S. Cl.
CPC ............... *F16C 3/02* (2013.01); *F16C 17/02* (2013.01); *F16C 23/045* (2013.01); *F16C 33/1045* (2013.01); *F05D 2220/40* (2013.01); *F05D 2240/53* (2013.01); *F05D 2260/96* (2013.01); *F16C 2202/06* (2013.01); *F16C 2360/24* (2013.01)

(58) Field of Classification Search
CPC .. F05D 2240/53; F05D 2260/96; F16C 17/02; F16C 23/045; F16C 3/02; F16C 33/1045; F16C 2202/06; F16C 2360/24
See application file for complete search history.

(56) References Cited

U.S. PATENT DOCUMENTS

| | | | |
|---|---|---|---|
| 8,790,066 B2 * | 7/2014 | Gutknecht | .......... F16C 33/1075 |
| | | | 415/111 |
| 8,961,128 B2 * | 2/2015 | Mavrosakis | .......... F01D 25/162 |
| | | | 415/229 |
| 2009/0056332 A1 | 3/2009 | Shimizu | |
| 2013/0220285 A1 | 8/2013 | Hayashi et al. | |
| 2016/0003140 A1 | 1/2016 | Garrard et al. | |
| 2016/0265386 A1 | 9/2016 | Annati et al. | |

FOREIGN PATENT DOCUMENTS

| | | | | |
|---|---|---|---|---|
| JP | 60-260481 A | 12/1985 | | |
| JP | 63-16134 A | 1/1988 | | |
| JP | 2-87903 U | 7/1990 | | |
| JP | 2001-527613 A | 12/2001 | | |
| JP | 2004-116317 A | 4/2004 | | |
| JP | 4600788 B2 | 12/2010 | | |
| JP | 5529714 B2 | 6/2014 | | |
| JP | 2014-238010 A | 12/2014 | | |
| JP | 2016-507700 A | 3/2016 | | |
| WO | WO 2007/108234 A1 | 9/2007 | | |
| WO | WO-2010135135 A2 * | 11/2010 | ........... F01D 25/166 | |
| WO | WO 2014/088824 A1 | 6/2014 | | |

OTHER PUBLICATIONS

Written Opinion of the International Searching Authority for International Application No. PCT/JP2018/005898, dated May 15, 2018, with English translation.

* cited by examiner

FORCED INDUCTION DEVICE

TECHNICAL FIELD

The present invention relates to a forced induction device.

BACKGROUND ART

A device called a forced induction device may be used to improve an engine output of an automobile or the like. The forced induction device supplies air compressed by a compressor to an engine. Examples of the forced induction device include a turbocharger that uses engine exhaust and a supercharger that is mechanically driven. For example, as described in Patent Document 1 below, a turbocharger includes a turbine, a compressor, and a rotor connecting the turbine and the compressor to each other. The turbine is rotated by the energy of an exhaust gas and the compressor coaxially connected to the turbine is rotated by the rotor so that air is compressed. The compressed air is supplied to the engine.

Here, in the above-described forced induction device, it is known that forced vibration called bending vibration occurs in the rotor. The bending vibration is resonance that occurs when a natural bending frequency of the rotor matches an operating rotational speed. The operating rotational speed at which bending vibration occurs is called a bending critical speed. There are a plurality of bending critical speeds from a low rotational speed region to a high rotational speed region and they are called a primary critical speed, a secondary critical speed, a tertiary critical speed, and the like. In general, the secondary critical speed is set to be sufficiently higher than a maximum rotational speed (rated rotational speed) when designing the forced induction device. That is, it is customary to expect a sufficient margin between the rated rotational speed and the secondary critical speed.

CITATION LIST

Patent Document

[Patent Document 1]
Japanese Patent No. 5529714

SUMMARY OF INVENTION

Technical Problem

However, in recent years, the high-speed rotation of the forced induction device is promoted in order to improve an output. Accordingly, since the value of the bending critical speed (secondary critical speed) approaches the value of the maximum rotational speed (rated rotational speed), there is a high possibility that vibration will occur in the rotor in a high rotational speed region.

The present invention has been made to solve the above-described problem and an object thereof is to provide a forced induction device in which vibration is further reduced.

Solution to Problem

According to a first aspect of the present invention, a forced induction device includes: a rotor which includes a turbine side shaft portion, a compressor side shaft portion, and a connection shaft portion provided between the turbine side shaft portion and the compressor side shaft portion to connect these to each other; a turbine side bearing which supports the turbine side shaft portion; and a compressor side bearing which supports the compressor side shaft portion, wherein rigidity of the connection shaft portion is lower than that of the turbine side shaft portion and the compressor side shaft portion so that a node in a mode shape at each critical speed associated with an operating rotational speed region of the rotor is located between the turbine side bearing and the compressor side bearing.

As a method of evaluating vibration characteristics of the rotor, a method called mode analysis is known. By performing the mode analysis, the mode shape for each vibration mode of the rotor can be obtained. On the basis of the mode shape, a position (node) where a vibration response (amplitude) is smallest is obtained. According to the above-described configuration, since the rigidity of the connection shaft portion is lower than that of the turbine side shaft portion and the compressor side bearing, the node in a mode shape is located between the turbine side bearing and the compressor side bearing. As a result, the vibration response in a portion close to the node (that is, the turbine side bearing and the compressor side bearing) can be suppressed to be small and the vibration propagating to the entire forced induction device through the turbine side bearing and the compressor side bearing can be reduced.

According to a second aspect of the present invention, the connection shaft portion may have a diameter smaller than that of the turbine side shaft portion and the compressor side shaft portion.

According to this configuration, the diameter of the connection shaft portion is smaller than the diameter of the turbine side shaft portion and the compressor side shaft portion. That is, the rigidity of the connection shaft portion can be easily and accurately reduced simply by adjusting the diameter of the connection shaft portion.

According to a third aspect of the present invention, an outer peripheral surface of the connection shaft portion and a first facing surface facing the compressor side shaft portion in the turbine side shaft portion may be connected to each other by a first rounded portion having a curved shape, and the outer peripheral surface of the connection shaft portion and a second facing surface facing the turbine side shaft portion in the compressor side shaft portion may be connected to each other by a second rounded portion having a curved shape.

According to this configuration, the connection shaft portion, the turbine side shaft portion, and the compressor side shaft portion are respectively connected by the first rounded portion and the second rounded portion. That is, a corner portion is not formed the connection portions of the connection shaft portion, the turbine side shaft portion, and the compressor side shaft portion. As a result, it is possible to avoid local stress concentration at the connection portion and ensure the durability of the rotor.

According to a fourth aspect of the present invention, the connection shaft portion may be formed of a material having a rigidity lower than that of the turbine side shaft portion and the compressor side shaft portion.

According to this configuration, the connection shaft portion is formed of a material having a rigidity lower than that of the turbine side shaft portion and the compressor side shaft portion. Accordingly, the rigidity of the connection shaft portion can be easily and accurately reduced.

According to a fifth aspect of the present invention, the inside of the connection shaft portion may be formed to be hollow.

According to this configuration, the rigidity of the connection shaft portion can be easily reduced simply by forming the inside of the connection shaft portion to be hollow.

According to a sixth aspect of the present invention, the connection shaft portion may include a low-rigidity portion having relatively low rigidity and a high-rigidity portion having relatively high rigidity, and the low-rigidity portion and the high-rigidity portion may be alternately arranged in a direction from the turbine side shaft portion toward the compressor side shaft portion.

According to this configuration, the rigidity of the connection shaft portion can be set to be lower than that of the turbine side shaft portion and the compressor side shaft portion and a decrease in strength of the connection shaft portion can be suppressed to be small as compared with the case where the rigidity of the connection shaft portion is uniformly lowered.

Advantageous Effects of Invention

According to the present invention, it is possible to provide a forced induction device in which vibration is further reduced.

DESCRIPTION OF EMBODIMENTS

First Embodiment

Figure 1:
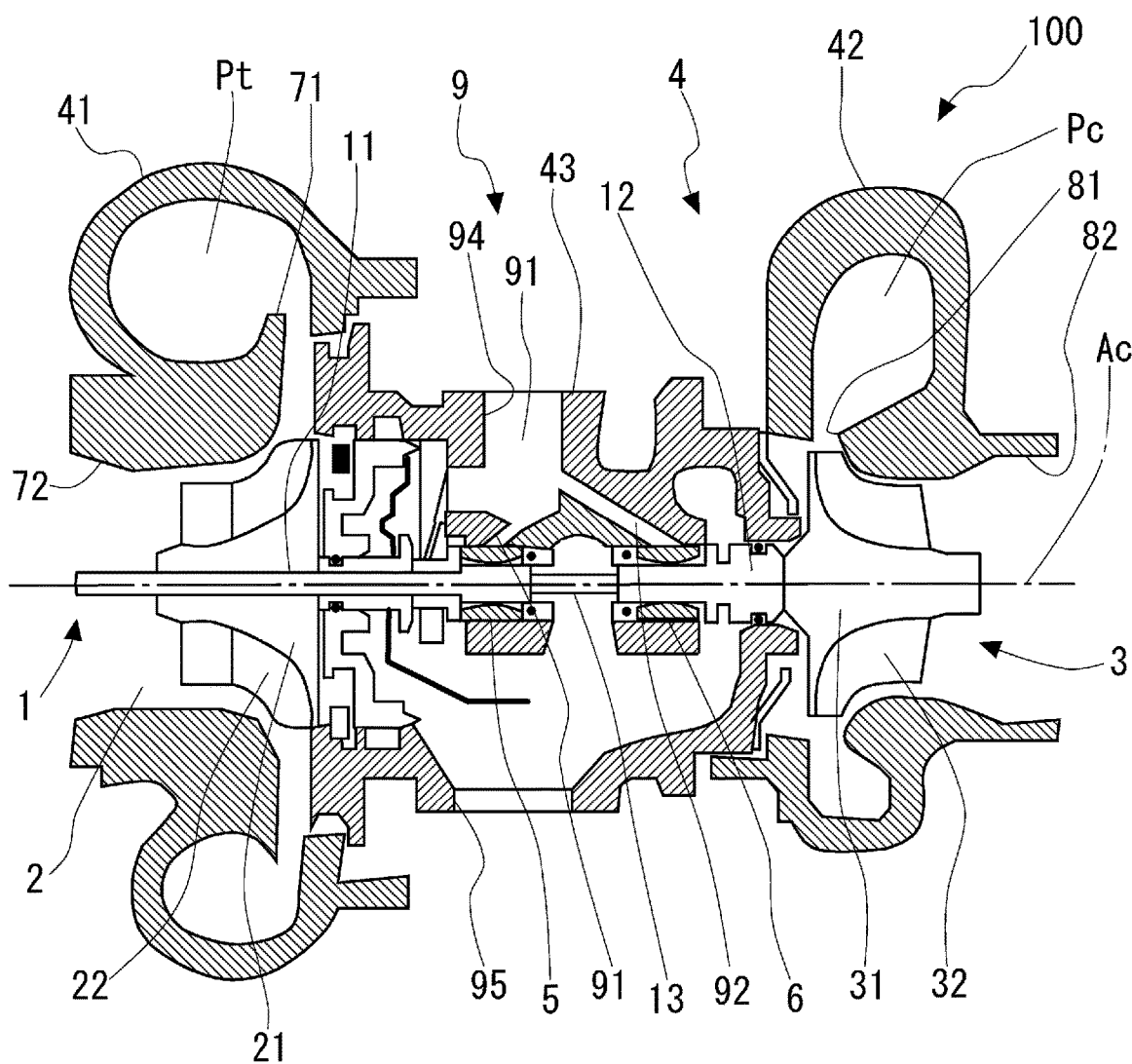
FIG. 1 is a cross-sectional view showing a configuration of a forced induction device according to a first embodiment of the present invention.

A first embodiment of the present invention will be described with reference to the drawings. A forced induction device 100 according to this embodiment is attached to, for example, an engine such as an automobile. The forced induction device 100 is used to improve an output of the engine by supplying compressed air thereto. As shown in FIG. 1, the forced induction device 100 includes a rotor 1, a turbine wheel 2, a compressor wheel 3, a housing 4, a turbine side bearing 5, and a compressor side bearing 6.

The rotor 1 has a columnar shape extending along an axis Ac. The rotor 1 includes a turbine side shaft portion 11 which has an end portion on one side in the direction of the axis Ac, a compressor side shaft portion 12 which has an end portion on the other side in the direction of the axis Ac, and a connection shaft portion 13 which is provided between the turbine side shaft portion 11 and the compressor side shaft portion 12 to connect these to each other. The connection shaft portion 13 has a diameter smaller than that of the turbine side shaft portion 11 and the compressor side shaft portion 12. Additionally, in this embodiment, the turbine side shaft portion 11, the compressor side shaft portion 12, and the connection shaft portion 13 are integrally formed of the same material. Further, in this embodiment, a cross-sectional shape of the connection shaft portion 13 (a cross-sectional shape in a plane orthogonal to the axis Ac) is circular.

Figure 2:
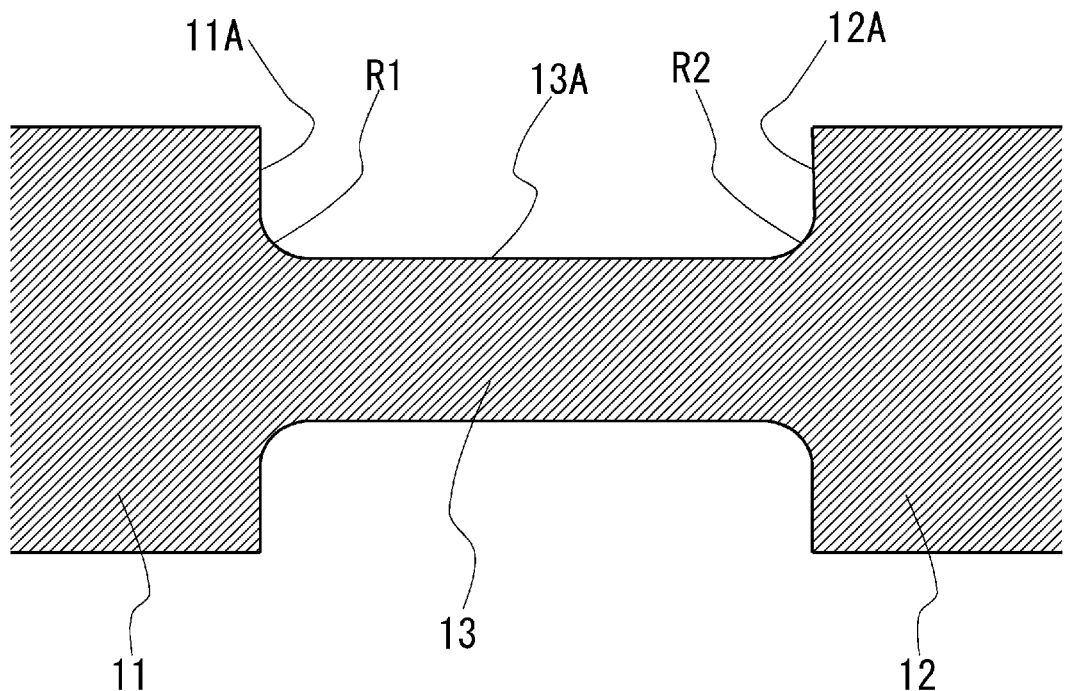
FIG. 2 is a schematic diagram showing a configuration of a rotor according to the first embodiment of the present invention.

Further, as shown in FIG. 2, an outer peripheral surface of the connection shaft portion 13 (a shaft outer peripheral surface 13A) and a first facing surface 11A facing the compressor side shaft portion 12 in the turbine side shaft portion 11 are connected to each other by a first rounded portion R1 having a curved shape. That is, in a cross-sectional view including the axis Ac, the first rounded portion R1 extends in a curved shape from the shaft outer peripheral surface 13A toward the first facing surface 11A. In other words, a corner portion is not formed between the shaft outer peripheral surface 13A and the first facing surface 11A. Similarly, the shaft outer peripheral surface 13A and a second facing surface 12A facing the turbine side shaft portion 11 in the compressor side shaft portion 12 are connected to each other by a second rounded portion R2 having a curved shape. That is, in a cross-sectional view including the axis Ac, the second rounded portion R2 extends from the shaft outer peripheral surface 13A toward the second facing surface 12A in a curved shape. In other words, a corner portion is not formed between the shaft outer peripheral surface 13A and the second facing surface 12A.

Again, as shown in FIG. 1, the turbine wheel 2 is attached to an end portion on one side in the direction of the axis Ac of the turbine side shaft portion 11. The turbine wheel 2 includes a turbine disk 21 which is formed in a disk shape around the axis Ac and a plurality of turbine blades 22 which are provided on one side in the direction of the axis Ac of the turbine disk 21. The plurality of turbine blades 22 are radially provided around the axis Ac.

The compressor wheel 3 is attached to an end portion on the other side in the direction of the axis Ac of the compressor side shaft portion 12. The compressor wheel 3 includes a compressor disk 31 which is formed in a disk shape around the axis Ac and a plurality of compressor blades 32 which are provided on the other side in the direction of the axis Ac of the compressor disk 31. The plurality of compressor blades 32 are radially provided around the axis Ac.

The turbine wheel 2, the compressor wheel 3, and the rotor 1 are covered by the housing 4 from the outside. More specifically, the housing 4 includes a turbine housing 41 which covers the turbine wheel 2, a compressor housing 42 which covers the compressor wheel 3, and a bearing housing 43 which stores a bearing device to be described later.

A turbine flow passage Pt which surrounds the turbine wheel 2 from the outer peripheral side and extends in an annular shape around the axis Ac is formed inside the turbine housing 41. One end of the turbine flow passage Pt is connected to an exhaust port (exhaust valve) of an engine (not shown). The inner peripheral side of the turbine flow passage Pt (exhaust gas inlet 71) opens toward the turbine wheel 2. A turbine outlet 72 which opens toward one side in the direction of the axis Ac is formed on the inner peripheral side of the turbine housing 41.

A compressor flow passage Pc which surrounds the compressor wheel 3 from the outer peripheral side and extends in an annular shape around the axis Ac is formed inside the compressor housing 42. One end of the compressor flow passage Pc is connected to an intake port (intake valve) of the engine. The inner peripheral side of the compressor flow passage Pc (air inlet 81) opens toward the compressor wheel 3. A compressor inlet 82 which opens toward the other side in the direction of the axis Ac is formed on the inner peripheral side of the compressor housing 42.

The bearing housing 43 is provided between the turbine housing 41 and the compressor housing 42. The turbine side bearing 5 and the compressor side bearing 6 are provided inside the bearing housing 43. The rotor 1 is supported by the turbine side bearing 5 and the compressor side bearing 6 to be rotatable around the axis Ac. More specifically, the turbine side bearing 5 supports the turbine side shaft portion 11 and the compressor side bearing 6 supports the compressor side shaft portion 12. Both the turbine side bearing 5 and the compressor side bearing 6 are oil lubricated radial bearings. The bearing housing 43 is provided with a lubricating oil supply section 9 which supplies lubricating oil to the turbine side bearing 5 and the compressor side bearing 6.

The lubricating oil supply section 9 includes an oil sump 91 which stores lubricating oil and first and second flow passages 92 and 93 which respectively extend from the oil sump 91 toward the turbine side bearing 5 and the compressor side bearing 6. Lubricating oil is supplied to the oil sump 91 through an oil inlet 94 formed in the bearing housing 43. The lubricating oil inside the oil sump 91 reaches the turbine side bearing 5 through the first flow passage 92 to lubricate the bearing. Similarly, the lubricating oil inside the oil sump 91 reaches the compressor side bearing 6 through the second flow passage 93 to lubricate the bearing. The lubricating oil having lubricated the turbine side bearing 5 and the compressor side bearing 6 is discharged to the outside through the oil outlet 95 formed in the bearing housing 43.

Next, an operation of the forced induction device 100 will be described. An engine exhaust is supplied to the turbine wheel 2 through the turbine flow passage Pt so that the turbine wheel 2 and the rotor 1 rotate. The engine exhaust having been used to rotate the turbine wheel 2 and the rotor 1 is discharged to an exhaust system including a catalyst device and a filter through the turbine outlet 72. Here, the compressor wheel 3 also rotates in accordance with the rotation of the turbine wheel 2 and the rotor 1 using the engine exhaust. By the rotation of the compressor wheel 3, external air is led from the compressor inlet 82 to the compressor wheel 3 through the compressor flow passage Pc. In accordance with the rotation of the compressor wheel 3, this air is gradually compressed into high-pressure air. The high-pressure air is supplied to an intake system of the engine through the compressor flow passage Pc. As a result, since the explosive power of the fuel is increased by the energy of the high-pressure air, the output of the engine can be improved.

Figure 3:
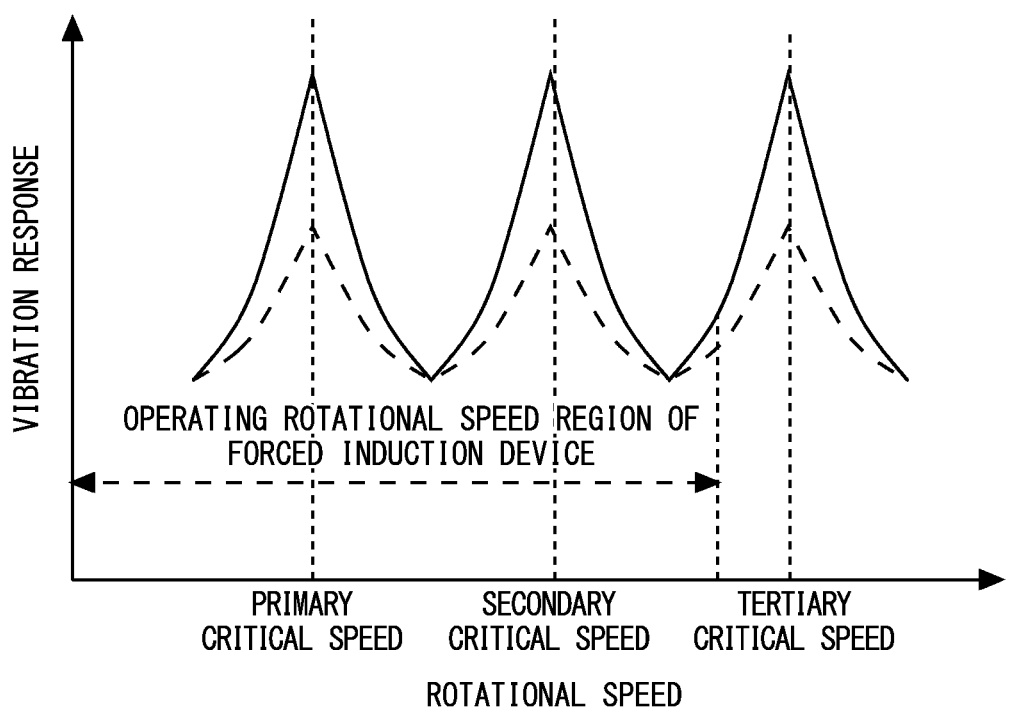
FIG. 3 is a graph showing a relationship between a rotational speed and a vibration response of the forced induction device according to the first embodiment of the present invention.

Here, in the forced induction device 100, it is known that forced vibration called bending vibration occurs in the rotor 1. Bending vibration is resonance that occurs when a natural bending frequency of the rotor 1 matches an operating rotational speed. The operating rotational speed at which bending vibration occurs is called a bending critical speed. There are a plurality of bending critical speeds from a low rotational speed region to a high rotational speed region and they are called a primary critical speed, a secondary critical speed, a tertiary critical speed, and the like (see FIG. 3). In recent years, the forced induction device 100 is rotated at a high speed in order to further improve the output. As a result, since the bending critical speed (secondary critical speed) approaches a maximum rotational speed (rated rotational speed), there is a possibility that vibration will occur in a high rotational speed region.

However, in the forced induction device 100 according to this embodiment, the connection shaft portion 13 of the rotor 1 has a diameter smaller than the other portions of the rotor 1 (the turbine side shaft portion 11 and the compressor side shaft portion 12). That is, the rigidity of the connection shaft portion 13 is lower than that of the turbine side shaft portion 11 and the compressor side shaft portion 12. As a result, the vibration response (amplitude) of the rotor 1 can be suppressed to be small.

Figure 4:
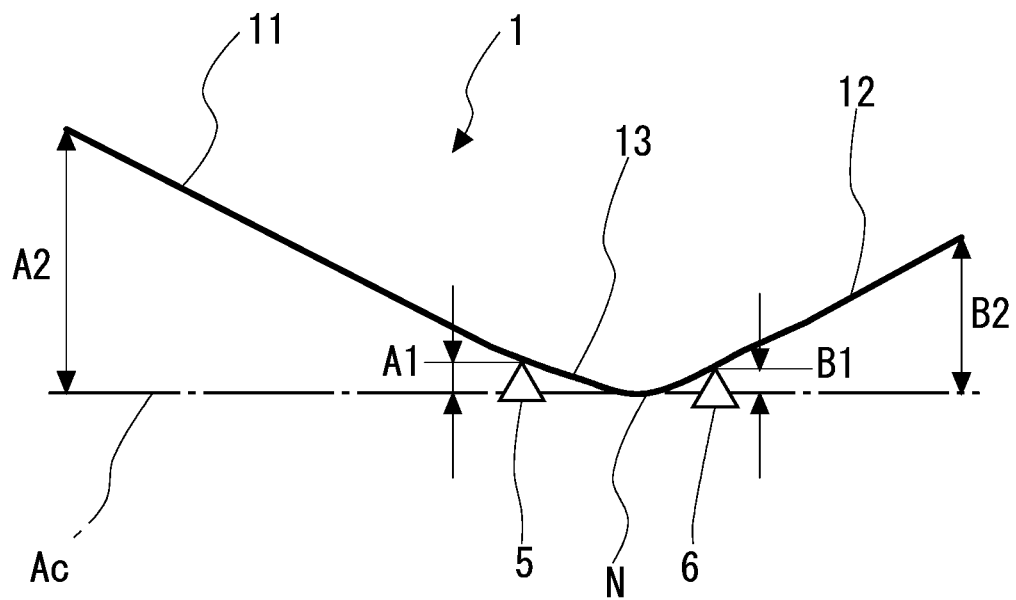
FIG. 4 is a schematic diagram showing a mode shape of a primary mode at a primary critical speed of a rotor according to the first embodiment of the present invention.
Figure 5:
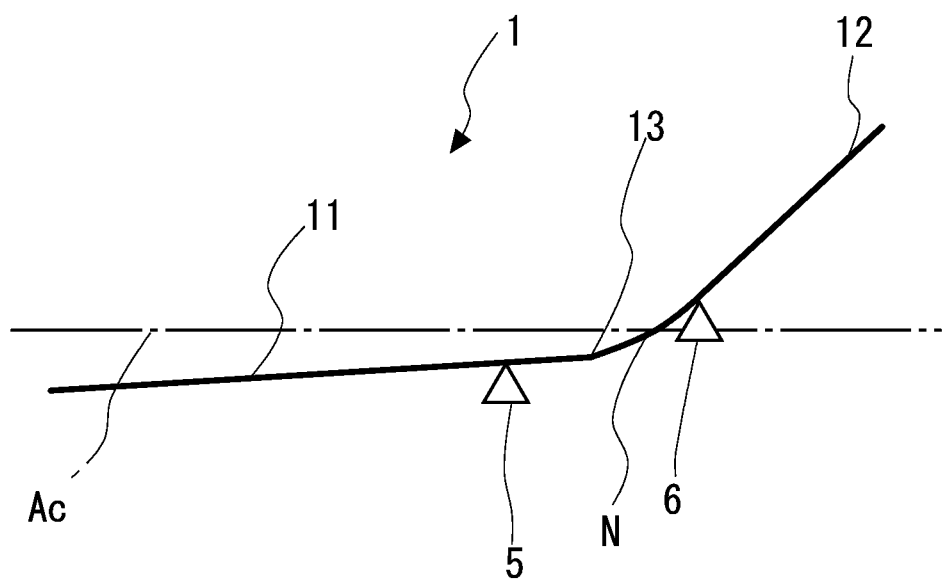
FIG. 5 is a schematic diagram showing a mode shape of a primary mode at a secondary critical speed of the rotor according to the first embodiment of the present invention.

The movement of the rotor 1 when the vibration occurs will be described in more detail with reference to FIGS. 4 and 5. FIG. 4 shows a mode shape of a dominant vibration mode (primary mode) of the rotor 1 at a primary critical speed. FIG. 5 shows a mode shape of a dominant vibration mode (primary mode) of the rotor 1 at a secondary critical speed. Additionally, a numerical simulation called mode analysis is preferably used when obtaining the mode shape of the rotor 1.

As can be seen from FIGS. 4 and 5, bending mode vibration occurs in the rotor 1 at the primary critical speed and the secondary critical speed. Here, since the rigidity of the connection shaft portion 13 is lower than the rigidity of the turbine side shaft portion 11 and the compressor side shaft portion 12, a position where the vibration response (amplitude) is smallest (node N) is located on the axis Ac between the turbine side bearing 5 and the compressor side bearing 6. That is, vibration occurs such that the turbine side shaft portion 11 and the compressor side shaft portion 12 are separated from the axis Ac while facing the same direction with respect to the node N. In this way, since the node N is located between the turbine side bearing 5 and the compressor side bearing 6, the vibration response (amplitude) of the turbine side bearing 5 and the compressor side bearing 6 becomes small. That is, as indicated by a dashed line graph in FIG. 3, the vibration response at the critical speed can be suppressed to be small over the entire operating rotational speed region of the forced induction device 100. As a result, the vibration propagating to the entire forced induction device 100 through the turbine side bearing 5 and the compressor side bearing 6 can be reduced even when the operating rotational speed reaches not only the primary critical speed but also the secondary critical speed.

As described above, according to the above-described configuration, since the rigidity of the connection shaft portion 13 is lower than the rigidity of the turbine side shaft portion 11 and the compressor side bearing 6, the node N in a mode shape is located between the turbine side bearing 5 and the compressor side bearing 6. As a result, the vibration response at a portion close to the node N (that is, the turbine side bearing 5 and the compressor side bearing 6) can be suppressed to be small and the vibration propagating to the entire forced induction device 100 through the turbine side bearing 5 and the compressor side bearing 6 can be reduced.

Further, according to the above-described configuration, the diameter of the connection shaft portion 13 becomes smaller than the diameter of the turbine side shaft portion 11 and the compressor side shaft portion 12. That is, the rigidity of the connection shaft portion 13 can be easily and accurately reduced simply by adjusting the diameter of the connection shaft portion 13.

Additionally, according to the above-described configuration, the connection shaft portion 13, the turbine side shaft portion 11, and the compressor side shaft portion 12 are respectively connected by a first rounded portion R1 and a second rounded portion R2. That is, a corner portion is not formed in the connection portions of the connection shaft portion 13, the turbine side shaft portion 11, and the compressor side shaft portion 12. As a result, it is possible to avoid local stress concentration at the connection portion and ensure the durability of the rotor 1.

Figure 8A:
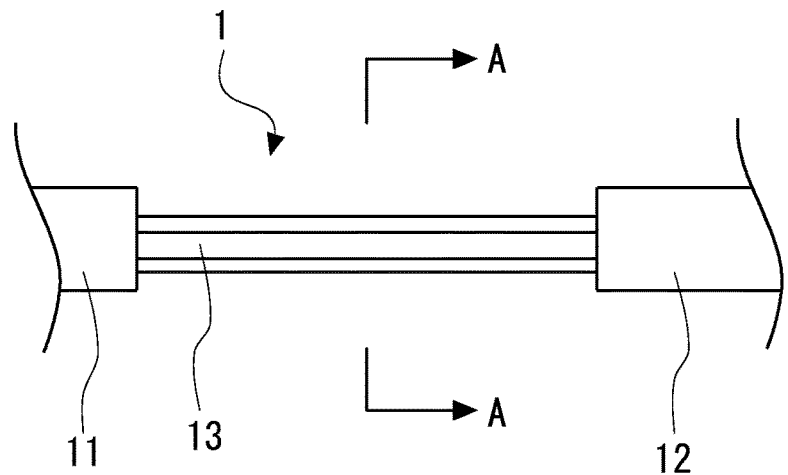
FIG. 8A is a diagram showing a modified example of the rotor according to the first embodiment of the present invention.
Figure 8B:
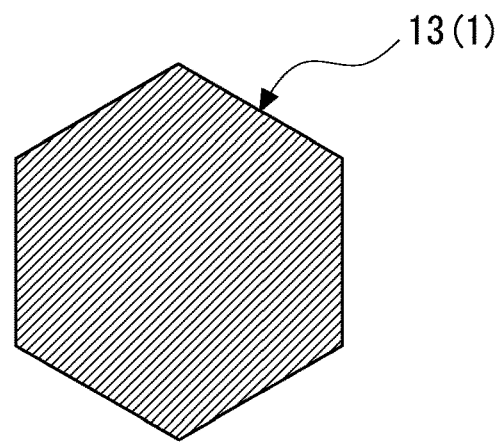
FIG. 8B is a cross-sectional view taken along a line A-A of FIG. 8A.

As described above, the first embodiment of the present invention has been described. Additionally, various changes and modifications can be made to the above-described configuration without departing from the spirit of the present invention. For example, in the first embodiment, an example in which the connection shaft portion 13 has a circular cross-sectional shape has been described. However, it is also possible to adopt a configuration shown FIGS. 8A and 8B. In these examples of FIGS. 8A and 8B, the connection shaft portion 13 has a polygonal cross-sectional shape. Although an example in which a hexagon is adopted as a polygon has been described, other shapes (square, regular pentagon, etc.) can be adopted.

Second Embodiment

Figure 9:
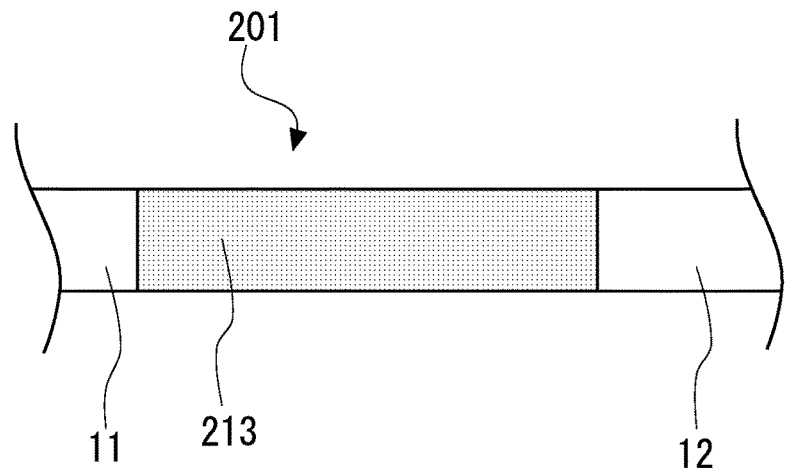
FIG. 9 is a diagram showing a configuration of a rotor according to a second embodiment of the present invention.

Next, a second embodiment of the present invention will be described with reference to FIG. 9. Additionally, the same component as that of the first embodiment will be denoted by the same reference numeral and detailed description will be omitted. In this embodiment, a connection shaft portion 213 of a rotor 201 is formed of a material having a rigidity lower than that of the turbine side shaft portion 11 and the compressor side shaft portion 12.

According to this configuration, the connection shaft portion 213 is formed of a material having a rigidity lower than that of the turbine side shaft portion 11 and the compressor side shaft portion 12. Thus, the rigidity of the connection shaft portion 213 can be easily and accurately adjusted simply by changing the material of the connection shaft portion 213.

As described above, the second embodiment of the present invention has been described. Additionally, various changes and modifications can be made to the above-described configuration without departing from the spirit of the present invention.

Third Embodiment

Figure 10:
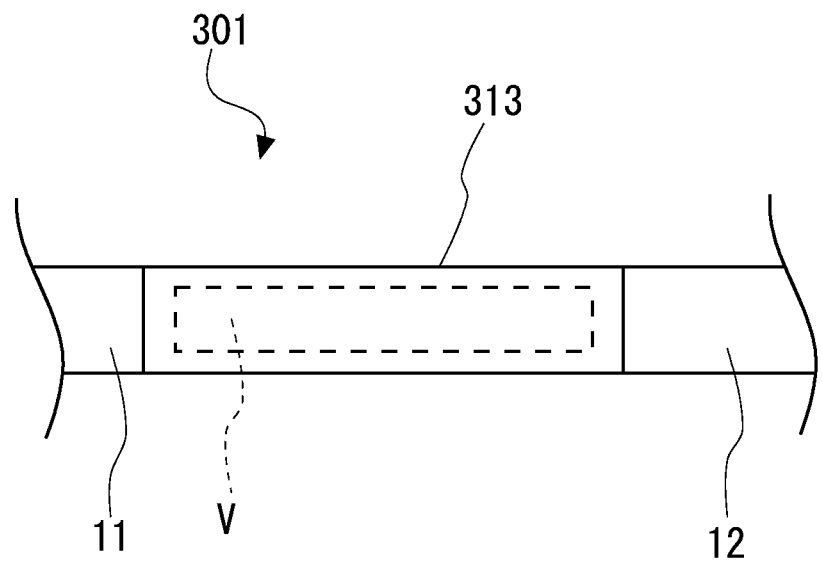
FIG. 10 is a diagram showing a configuration of a rotor according to a third embodiment of the present invention.

Next, a third embodiment of the present invention will be described with reference to FIG. 10. Additionally, the same component as that of the first embodiment will be denoted by the same reference numeral and detailed description will be omitted. As shown in FIG. 10, in this embodiment, a connection shaft portion 313 of a rotor 301 is formed to be hollow. Specifically, a space which is a hollow portion V is formed inside the connection shaft portion 313. On the other hand, the turbine side shaft portion 11 and the compressor side shaft portion 12 are formed to be solid. Thus, the connection shaft portion 313 has rigidity lower than that of the turbine side shaft portion 11 and the compressor side shaft portion 12.

According to this configuration, the rigidity of the connection shaft portion 313 can be easily set to be lower than the rigidity of the turbine side shaft portion 11 and the compressor side shaft portion 12 simply by forming the connection shaft portion 313 to be hollow.

As described above, the third embodiment of the present invention has been described. Additionally, various changes and modifications can be made to the above-described configuration without departing from the spirit of the present invention.

Fourth Embodiment

Figure 11:
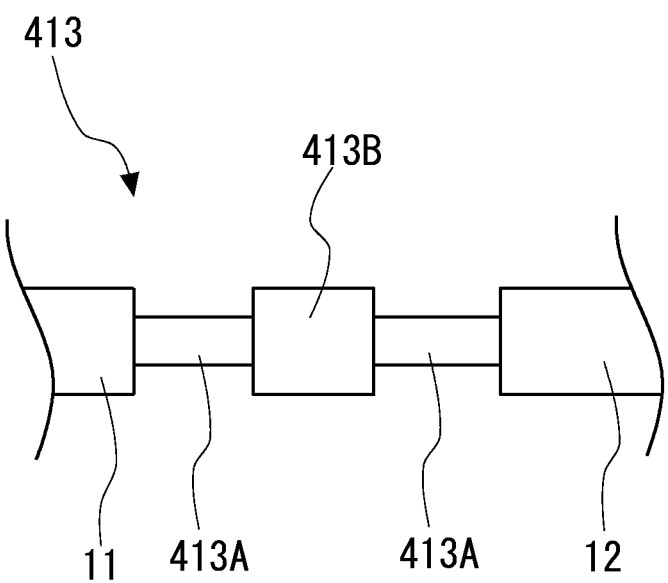
FIG. 11 is a diagram showing a configuration of a rotor according to a fourth embodiment of the present invention.

Next, a fourth embodiment of the present invention will be described with reference to FIG. 11. Additionally, the same component as that of the first embodiment will be denoted by the same reference numeral and detailed description will be omitted. As shown in FIG. 11, in this embodiment, a connection shaft portion 413 includes a low-rigidity portion 413A and a high-rigidity portion 413B. The low-rigidity portion 413A has rigidity relatively lower than that of the high-rigidity portion 413B. The high-rigidity portion 413B has rigidity relatively higher than that of the low-rigidity portion 413A. The high-rigidity portion 413B and the low-rigidity portion 413A are alternately arranged in a direction from the turbine side shaft portion 11 toward the compressor side shaft portion 12.

More specifically, in this embodiment, the high-rigidity portion 413B has relatively high rigidity since the diameter is larger than that of the low-rigidity portion 413A. The low-rigidity portion 413A has relatively low rigidity since the diameter is smaller than that of the high-rigidity portion 413B.

According to this configuration, the rigidity of the connection shaft portion 413 can be set to be lower than that of the turbine side shaft portion 11 and the compressor side shaft portion 12 and a decrease in strength of the connection shaft portion 413 can be suppressed to be small as compared with the case where the rigidity of the connection shaft portion 413 is uniformly lowered.

As described above, the fourth embodiment of the present invention has been described. Additionally, various changes and modifications can be made to the above-described configuration without departing from the spirit of the present invention. For example, in the fourth embodiment, an example in which the high-rigidity portion 413B and the low-rigidity portion 413A are formed with different diameters has been described. However, the configurations of the high-rigidity portion 413B and the low-rigidity portion 413A are not limited to the description above.

Figure 12:
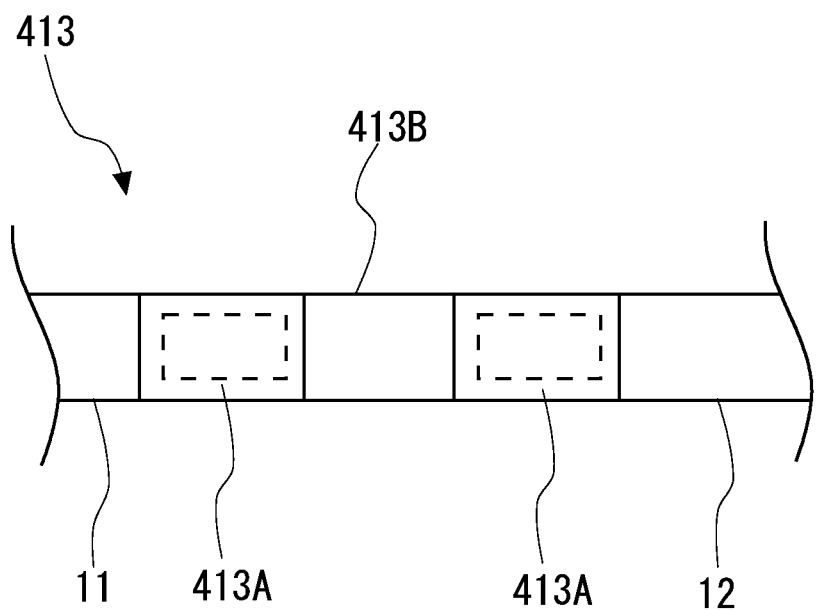
FIG. 12 is a diagram showing a modified example of the rotor according to the fourth embodiment of the present invention.
Figure 13:
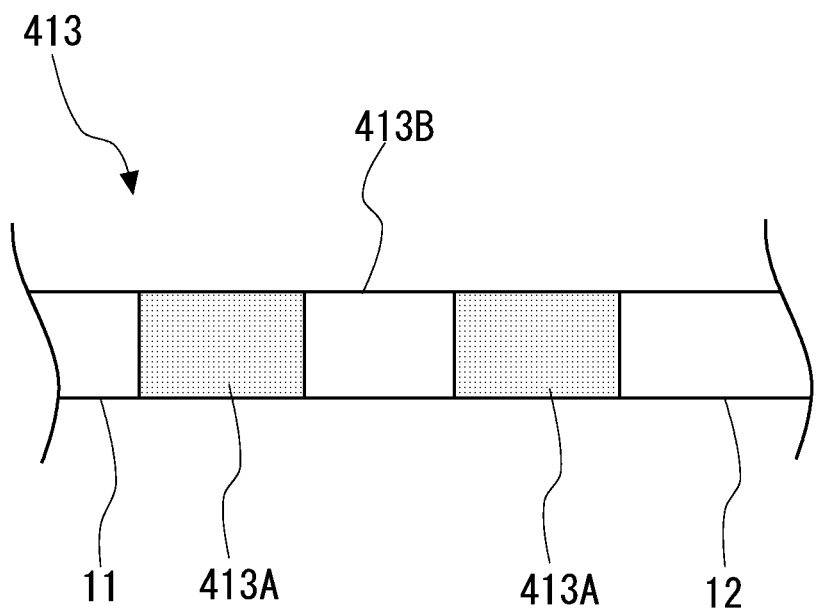
FIG. 13 is a diagram showing another modified example of the rotor according to the fourth embodiment of the present invention.

As another example, as shown in FIG. 12, the diameters of the high-rigidity portion 413B and the low-rigidity portion 413A can be set to be the same as each other and a hollow part V2 which is the low-rigidity portion 413A and a solid part V1 which is the high-rigidity portion 413B can be alternately formed. As still another example, as shown in FIG. 13, the diameters of the low-rigidity portion 413A and the high-rigidity portion 413B can be set to be the same as each other, the high-rigidity portion 413B can be formed of a material having higher rigidity than the low-rigidity portion 413A, and the low-rigidity portion 413A can be formed of a material having a rigidity lower than that of the high-rigidity portion 413B. In all of these configurations, the same operations and effects as those of the configuration according to the fourth embodiment can be obtained.

COMPARATIVE EXAMPLE

Figure 6:
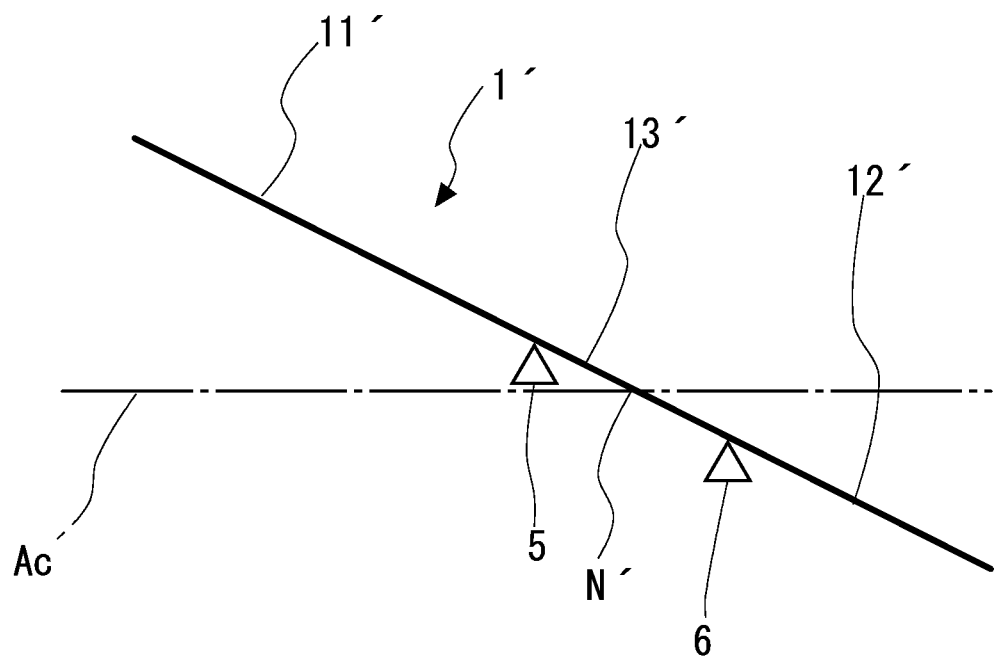
FIG. 6 is a schematic diagram showing a mode shape of a primary mode at a primary critical speed of a rotor according to a comparative example of the present invention.
Figure 7:
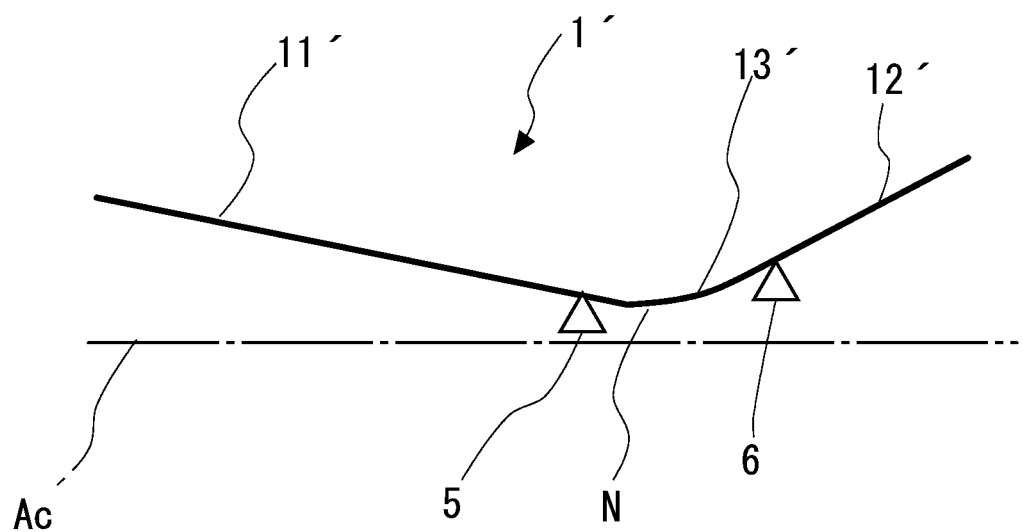
FIG. 7 is a schematic diagram showing a mode shape of a primary mode at a secondary critical speed of the rotor according to the comparative example of the present invention.

A comparative example of the first embodiment will be described with reference to FIGS. 6 and 7. In this comparative example, the movement of a comparative rotor 1' different from the first embodiment will be described. In the comparative rotor 1', a turbine side shaft portion 11', a connection shaft portion 13', and a compressor side shaft portion 12' have the same rigidity. FIG. 6 shows a mode shape of a dominant vibration mode (primary mode) of the comparative rotor 1' at a primary critical speed. FIG. 7 shows a mode shape of a dominant vibration mode (primary mode) of the comparative rotor 1' at a secondary critical speed.

As can be seen from FIG. 6, vibration of a conical mode occurs in the comparative rotor 1' at the primary critical speed. More specifically, the comparative rotor 1' causes vibration that swirls in a conical shape around the axis Ac at the primary critical speed. At this time, as shown in the same drawing, a vibration response that deviates radially outward from the axis Ac occurs at the positions of the turbine side bearing 5 and the compressor side bearing 6. That is, the vibration of the comparative rotor 1' propagates to the entire device through the turbine side bearing 5 and the compressor side bearing 6.

Further, as can be seen from FIG. 7, bending mode vibration occurs in the comparative rotor 1' at the secondary critical speed. Here, a node N' in a mode shape is located between the turbine side bearing 5 and the compressor side bearing 6. However, the node N' of the comparative rotor 1 is located at a position that deviates radially outward from the axis Ac unlike the first embodiment. That is, it can be seen that a vibration response larger than that of the rotor 1 according to the first embodiment also occurs at the node N'. Thus, the vibration of the comparative rotor 1' propagates to the entire device through the turbine side bearing 5 and the compressor side bearing 6.

As described above, in the configuration according to the comparative example, it can be seen that a large vibration response occurs in the comparative rotor 1' at both the primary critical speed and the secondary critical speed. In other words, it can be seen that the configuration according to each of the above-described embodiments has a remarkable and significant effect compared to this comparative example.

INDUSTRIAL APPLICABILITY

According to the forced induction device of the above-described aspect, vibration can be further reduced.

REFERENCE SIGNS LIST 1, 201, 301 Rotor
2 Turbine wheel
3 Compressor wheel
4 Housing
5 Turbine side bearing
6 Compressor side bearing
9 Lubricating oil supply section
11 Turbine side shaft portion
11A First facing surface
12 Compressor side shaft portion
12A Second facing surface
13, 213, 313, 413 Connection shaft portion
13A Shaft outer peripheral surface
21 Turbine disk
22 Turbine blade
31 Compressor disk
32 Compressor blade
41 Turbine housing
42 Compressor housing
43 Bearing housing
71 Exhaust gas inlet
72 Turbine outlet
81 Air inlet
82 Compressor inlet
91 Oil sump
92 First flow passage
93 Second flow passage
94 Oil inlet
95 Oil outlet
100 Forced induction device
413A Low rigidity portion
413B High rigidity portion
Ac Axis
N, N' Node
Pc Compressor flow passage
Pt Turbine flow passage
R1 First rounded portion
R2 Second rounded portion
V Hollow portion
V1 Solid part
V2 Hollow part

The invention claimed is:
1. A forced induction device comprising:
a rotor which includes a turbine side shaft portion, a compressor side shaft portion, and a connection shaft portion provided between the turbine side shaft portion and the compressor side shaft portion to connect these to each other;
a turbine side bearing which supports the turbine side shaft portion; and
a compressor side bearing which supports the compressor side shaft portion,
wherein rigidity of the connection shaft portion is lower than that of the turbine side shaft portion and the compressor side shaft portion so that a node in a mode shape at each critical speed associated with an operating rotational speed region of the rotor is located between the turbine side bearing and the compressor side bearing,
wherein the connection shaft portion has a polygonal cross-sectional shape,
wherein the connection shaft portion includes a low-rigidity portion having relatively low rigidity and a high-rigidity portion having relatively high rigidity, wherein diameters of the high-rigidity portion and the low-rigidity portion are set to be the same as each other, and wherein the low-rigidity portion and the high-rigidity portion are alternately arranged in a direction from the turbine side shaft portion toward the compressor side shaft portion.

2. The forced induction device according to claim 1,
wherein a hollow part which is the low-rigidity portion and a solid part (V1) which is the high-rigidity portion are alternately formed.

3. The forced induction device according to claim 1,
wherein the low-rigidity portion are formed of a material having a rigidity lower than that of the high-rigidity portion.

* * * * *